Oct. 24, 1933.    B. E. LEEVER    1,931,765
BEVERAGE CAPSULE
Filed May 9, 1932
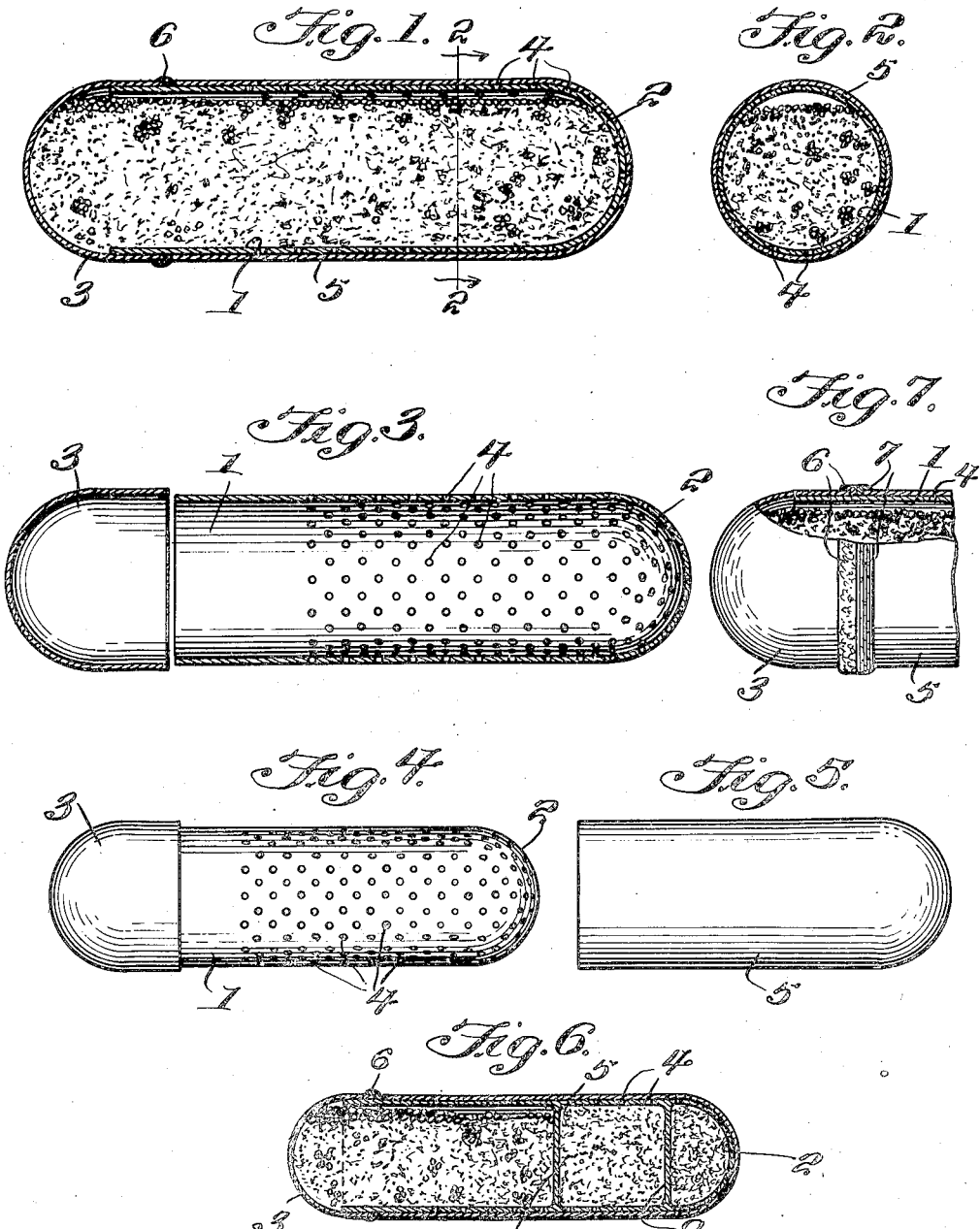
Basil E. Leever
INVENTOR
BY Victor J. Evans & Co.
ATTORNEY
WITNESS:

Patented Oct. 24, 1933

1,931,765

UNITED STATES PATENT OFFICE 1,931,765

BEVERAGE CAPSULE

Basil E. Leever, Santa Barbara, Calif.

Application May 9, 1932. Serial No. 610,245

3 Claims. (Cl. 53—3)

This invention relates to beverage containers, and its general object is to provide a capsule for not only preserving ground coffee and like products so as to enable the consumer to have the product in an absolutely fresh condition at the time of use by receiving it in a hermetically sealed container, but also to enable the consumer to have the convenience of preparing a beverage such as coffee, without the use of special utensils, as the filled capsule can be placed in boiling water in a pan or container of any type and produce a delicious beverage free from grounds, sediment, foreign matter or residue.

A further object of the invention is to provide a capsule for the purpose set forth, that is simple in construction, yet is extremely efficient for the purpose intended.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1 is a longitudinal sectional view taken through a capsule constructed in accordance with the present invention with the same filled with beverage making material.

Figure 2 is a sectional view taken approximately on line 2—2 of Figure 1, looking in the direction of the arrows.

Figure 3 is a longitudinal sectional view taken through the inner body of the capsule and the cap therefor prior to the parts being associated.

Figure 4 is an elevation of the body and cap associated.

Figure 5 is a similar view of the cover member.

Figure 6 is a longitudinal sectional view taken through a modified form of the invention.

Figure 7 is a fragmentary view of the capsule with parts broken away and in section.

Referring to the drawing in detail, the reference numeral 1 indicates the body of my capsule which as shown is of the usual tubular formation and is provided with a closed end 2 while its opposite end is open and is adapted to receive a cap 3.

The body is provided with a plurality of staggeredly arranged apertures 4 for a purpose which will be presently apparent and I provide an imperforated cover 5 for the body which snugly fits the same and is of a size to be disposed in close association with the cap 3, but it will be noted that there is a space between the confronting ends of the cap 3 and cover 5 for the purpose of receiving bands of sealing material. One of these bands is indicated by the reference numeral 6 and is formed from permanent sealing material or in other words materal which is not affected by boiling water, and the band 6 is provided for securing the cap 3 to the body, while the band 7 which is soluble in water is adapted for securing the cover 5 to the body 1, and as these bands are disposed in contacting engagement with each other, it will be apparent that they adhere accordingly.

In Figure 6 I have illustrated a slightly modified form of my invention, in that I provide partitions disposed within the capsule which is otherwise identical in construction with the form shown in Figures 1 to 5 inclusive. The partitions are of course adapted to separate various ingredients, and for example the partition 8 may separate ground coffee and powdered milk, while the partition 9 separates the powdered milk from sugar.

From the above description and disclosure of the drawing, it will be obvious that I have provided a capsule designed for making beverages and the product from which the beverage is brewed is disposed within the body 1. The cap is then applied thereto and sealed through the medium of the band 6. The cover is then applied to the body but prior to sealing the same, through the medium of the band 7, air is exhausted from the capsule and as the cap and body are sealed, air will be excluded, with the result the contents of the capsule will be retained in a clean and fresh condition until the time the capsule is used.

In the use of the capsule the cover 5 is removed just prior to disposing the remaining portion in water, and it will be apparent that when the cover is removed, and the remaining portion is placed in water, the latter will freely pass through the apertures 4 which are of a size for that purpose but will prevent the contents of the capsule from passing therethrough, therefore after the beverage is brewed, it will be free from grounds, sediment, foreign matter or residue, and at the same time the body and its cap 3 provide a container for the residue which can be disposed of in an easy and convenient manner, without the usual incommodious methods experienced with loose grounds, residue and the like.

By employing the capsule, the beverage can be brewed in a pan or container of any type, or in other words in the making of coffee, a percolator or like type of cooking utensil is not necessary, and I want it understood that the capsule can be made in any size to be sold accordingly so that the consumer can select the size of capsule desired for brewing or making predetermined cups or glasses of beverages. The capsule can be formed in any shape and from any material, but is preferably formed from transparent material such as cellophane and while I have shown the same as being in the form of a spheroid, it can be just as easily made in the form of a sphere.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A capsule for making beverages comprising a perforated body adapted to receive beverage making products and having an open end, a cap for closing said end, a band of insoluble sealing material securing the cap to said body, a cover for said body and adapted to close the openings, and a band of soluble sealing material securing the cover to said body.

2. A capsule for making beverages comprising a perforated body having an open end and adapted to receive beverage making products, a cap for closing the open end, means for permanently sealing the cap to said body, a cover for closing the apertures, means for detachably sealing the cover to said body, and partitions arranged in said body to separate various products therein.

3. A transparent hermetically sealed vacuum container comprising a perforated body adapted to receive beverage making products and having an open end, a cap telescopically received by said body and closing said end, means for permanently sealing said cap to said body, a cover telescopically receiving said body and closing the apertures thereof, and soluble means for detachably sealing the cover to said body.

BASIL E. LEEVER.